Aug. 8, 1961     D. L. WAUGH     2,995,176
V-BELT CONSTRUCTION
Filed Nov. 28, 1956
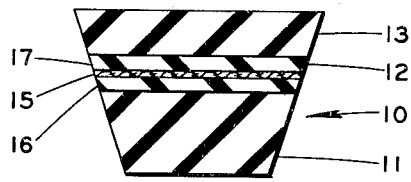
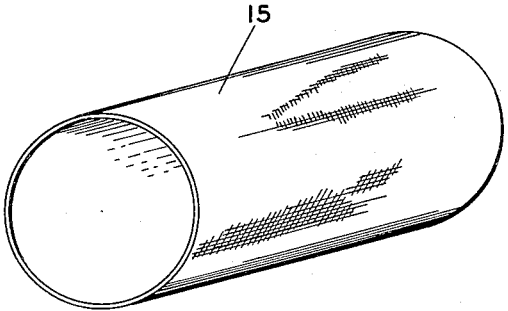
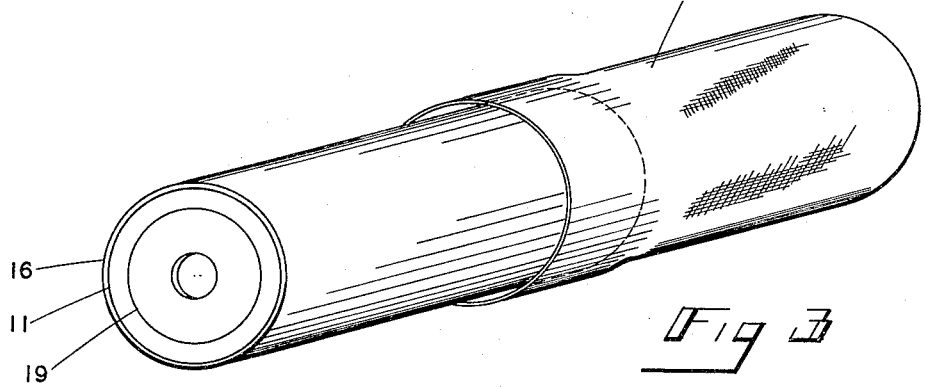
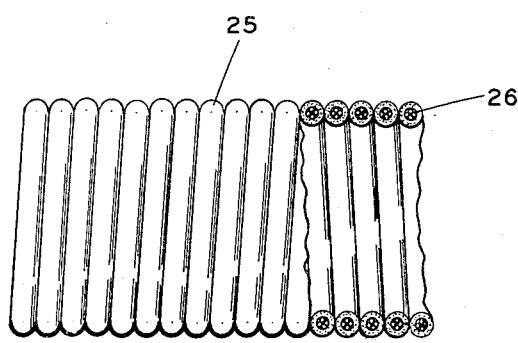
DALE L. WAUGH
*INVENTOR.*
BY *Reuben Wolk*
ATTORNEY

United States Patent Office 2,995,176
Patented Aug. 8, 1961

2,995,176
V-BELT CONSTRUCTION
Dale L. Waugh, Dayton, Ohio, assignor to Dayco Corporation, a corporation of Ohio
Filed Nov. 28, 1956, Ser. No. 624,795
3 Claims. (Cl. 154—4)

This invention relates to flexible belts and more particularly to a V-belt construction providing improved drive and power transmission means.

Such belts are subjected to great variation in longitudinal tension and compression, particularly in the region of the neutral axis. They must be flexible but it is very important that there be no excessive belt stretch and that they be of such uniformity of construction that excessive localized wear is avoided in use. For maximum operating life and efficiency, transmission belts are required to have uniform sectional strength and flexibility. A primary objective is to provide a belt that will run with a minimum of internal stress. Heretofore flexible belts have been constructed to include either reinforcing cords or cord fabric in the neutral axis section in efforts to give necessary strength and stretch control. In the forming of this neutral axis section in prior art belts, difficulty has been experienced in maintaining the reinforcing elements, whether of cord or cord fabric material, in symmetrical arrangement so as to obtain uniformity of strength throughout the belt and a minimum of internal stress. This difficulty has often resulted in an inferior product providing friction and localized weakness with corresponding decrease of the belt efficiency and effectiveness in use.

The present invention is directed to providing a V-belt of an improved construction wherein the neutral axis reinforcing means is provided by a member of synthetic material. This improvement provides complete uniformity of reinforcement of the belt and internal friction and stretch are reduced to a minimum thereby. The belt resulting is continuously uniform with a high degree of strength and flexibility and free of problems such as indicated with respect to prior art belts. As an alternative to the use of the preferred synthetic material as the neutral axis reinforcing means, the present invention further proposes the use of a continuous helix of coated cord in tubular form for application as the reinforcing element for the neutral axis section in fabrication of flexible belts.

An object of the invention is to provide an improved V-belt construction having improved strength and wear characteristics.

A further object of the invention is to provide an improved V-belt construction wherein the neutral axis is reinforced by a continuous member of synthetic material.

Another object of the invention is to provide a method of fabricating an improved V-belt wherein a tubular member of uniform thickness is stretched over the compression section to establish it in a neutral axis layer in order to provide a belt unit thereby of considerable strength, minimum internal friction and uniform wear characteristics.

An additional object of the invention is to provide an improved fabrication of flexible belts wherein the reinforcing section at the neutral axis layer is made of a tubular helix of coated nylon cord or the like.

Another object of the invention is to provide an improved belt construction wherein the neutral axis layer is reinforced by a stretched or wrapped member of synthetic material.

A further object of the invention is to provide an improved belt construction possessing the advantageous structural features, the inherent meritorious characteristics, and the mode of operation herein described.

With these and other objects in view, the invention intended to be protected by Letters Patent consists of the features of construction, the parts and combinations thereof, and the mode of operation as hereinafter described or illustrated in the accompanying drawings, or their equivalents.

Referring to the drawings, wherein is illustrated preferred forms, but obviously not necessarily the only form of embodiment of the invention;

FIGURE 1 shows a cross-section of the improved V-belt construction provided by the invention;

FIGURE 2 illustrates a tubular member forming the reinforcing element for the belt of FIGURE 1;

FIGURE 3 illustrates the tubular reinforcing member of FIGURE 2 as applied in the building of improved belt of FIGURE 1;

FIGURE 4 is a view, partly in cross-section, of a tubular helical reinforcing member made in accordance with a modified form of the invention.

As shown in FIGURE 1, the preferred embodiment of the invention provides a raw edge rubber V-belt 10 consisting of a compression section 11, a neutral axis section 12 and a tension section 13. The compression and tension sections 11 and 13, respectively, may be formed of rubber material having the necessary characteristics and in a manner well known in the prior art. The neutral axis section 12, however, consists of a tubular member 15, sandwiched between two thin layers of rubber 16 and 17. The tubular member 15 may be made of plastic film formed by continuous extrusion, calendering, or other well-known processes. The plastic material may be polyvinyl chloride, vinyl chloride, vinylidene chloride, polyesters, polyethylenes, or polyamides, as well as other well-known synthetic materials commonly referred to as plastics.

The tubular member 15 may also be a fabric sheet, rather than a solid film. For example, synthetic fibers such as nylon, rayon, Orlon, various forms of acrylic fibers, vinyl chloride-vinyl acetate combinations, vinylidene chloride, or polyesters may be used. These fibers may then be knitted or woven into a tubular sheet which is then used as described below.

In accordance with the invention the belt is built by forming a belt sleeve in the usual manner on a mandrel 19. The compression section 11 is first wrapped about the mandrel and a first layer 16 of the neutral axis section is then applied thereabout in containing relation thereto. The diameter of tubular member 15 is slightly smaller than the external diameter of the built-up layers 11 and 16 on the mandrel and is stretched over the compression section 11 and neutral axis layer 16 built up on the mandrel as shown in FIGURE 3 of the drawings. This provides a compacting and compression of the sections 11 and 16. The outer section 17 of the neutral axis layer is then applied about the member 15 followed by the tension layer 13. To promote adhesion between the member 15 and adjacent belt layers, the tubular member 15 is coated with a suitable adhesive. The built-up structure thus provided is then cut in a conventional manner to produce continuous belts as shown in FIGURE 1 of the drawings. The layers of the belt may be vulcanized together either before or after the belts are cut.

As an alternative, the tubular member can be formed of one or more layers of sheet or film first coated with the suitable adhesive to promote adhesion and wrapped about the layer 16 to build up the neutral axis layer. This member is preferably of the same material as member 15 just described.

A modification of the invention is shown in FIGURE 4, in which a tubular helix 25 is first formed from cord 26 by spinning the cord on the mandrel and causing adhesion of contacting adjacent turns by coating or dipping the formed helix in an adhesive. The coated cord employed should be of resilient material such as nylon or the like so the tubular helix may be stretched and applied in the manner of the member 15 in the first described embodiment of the invention by stretching over the built-up compression section 11 and layer 16 of a neutral axis section to maintain the desired belt configuration.

In either instance the invention provides a tubular member of uniformly reinforcing character that bonds to the inner layers of the built-up belt in firm containing relation thereto. The belt sections resulting are uniform throughout and have the strength and resiliency of a distinctly improved nature which will insure maintenance of the belt dimension in use. Essentially, maximum strength and flexibility are provided in the neutral axis of the belt with an absolute minimum of internal friction resulting. The containing effect of resilient sheet, film or helix reinforcement also guarantees that the resultant belt will not permanently stretch out of contour and excessive localized wear will be avoided. Thus, internal weakness and belt failure is substantially avoided in accordance with the invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but a few of the several modes of putting the invention into effect.

Having thus described my invention, I claim:

1. A method of forming stretch and wear-resistant V-type belts of increased strength and flexibility comprising the steps of fabricating a tubular member of synthetic material, building up a compression section and a portion of the neutral axis section of rubber on a mandrel to a diameter slightly exceeding the internal diameter of said tubular member, stretching said tubular member over said compression section and the neutral axis portion, completing the neutral axis section with an additional layer of rubber material, forming a tension section about said layer of rubber material, and dividing the belt cylinder so formed into continuous belt sections.

2. A method of forming stretch and wear-resistant V-type belts of increased strength and flexibility comprising the steps of fabricating a tubular helix by spinning nylon cord about a mandrel, coating said tubular helix to cause adhesion of adjacent turns, building up a compression section and a portion of the neutral axis section of the belt of rubber material to a diameter slightly exceeding the internal diameter of said tubular helix, stretching said tubular helix over said compression and the neutral axis sections in compressing relation thereto, completing the neutral axis section and the tension section by wrapping sheet rubber about said tubular helix and dividing the belt cylinder so formed into a continuous belt section.

3. A method of forming stretch and wear-resistant V-type belts of increased strength and flexibility comprising the steps of spinning cords of synthetic material into a tubular helix, coating said tubular helix to cause adhesion of adjacent turns, building up a compression section and a portion of the neutral axis section of sheet rubber on a mandrel to a diameter slightly exceeding the internal diameter of said tubular helix, stretching said tubular helix over said compression and neutral axis sections and completing the neutral axis section and tension section with layers of rubber about said tubular helix and dividing the belt cylinder so formed into continuous belt sections.

References Cited in the file of this patent

UNITED STATES PATENTS

| | | |
|---|---|---|
| 1,279,601 | Spadone | Sept. 24, 1918 |
| 1,749,046 | Snyder | Mar. 4, 1930 |
| 2,287,780 | Carman | June 30, 1942 |
| 2,288,669 | Atkinson | July 7, 1942 |
| 2,446,310 | Steinke | Aug. 3, 1948 |
| 2,582,366 | White | Jan. 15, 1952 |
| 2,597,858 | Freedlander | May 27, 1952 |
| 2,608,874 | Waugh | Sept. 2, 1952 |
| 2,642,751 | Freedlander | June 23, 1953 |
| 2,698,032 | Bacon | Dec. 28, 1954 |
| 2,733,734 | Woodward et al. | Feb. 7, 1956 |
| 2,773,540 | Waugh | Dec. 11, 1956 |
| 2,793,151 | Arnett | May 21, 1957 |

FOREIGN PATENTS

| | | |
|---|---|---|
| 212,964 | Great Britain | Mar. 17, 1924 |
| 750,356 | Great Britain | June 30, 1956 |
| 1,085,331 | France | July 21, 1954 |